Figure 1:
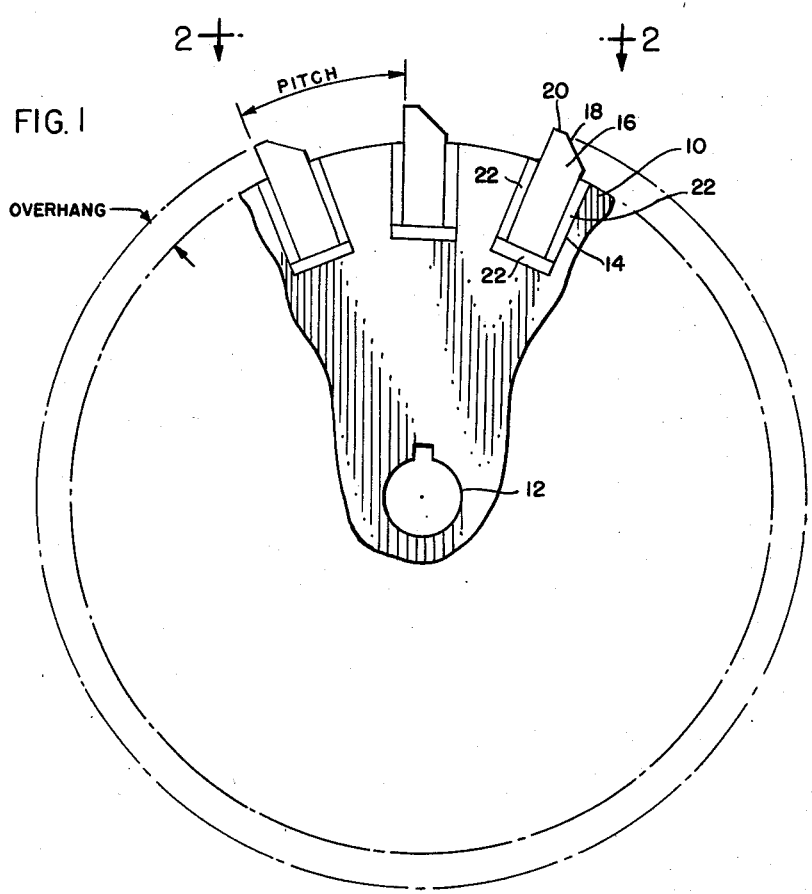

May 24, 1960     S. E. RUSINOFF     2,937,433
INSERTED-BLADE MILLING CUTTERS
Filed Feb. 15, 1957

INVENTOR:
SAMUEL E. RUSINOFF
ATT'YS

# United States Patent Office 2,937,433
Patented May 24, 1960

2,937,433

INSERTED-BLADE MILLING CUTTERS

Samuel E. Rusinoff, Chicago, Ill., assignor to Walter G. See, Crown Point, Ind.

Filed Feb. 15, 1957, Ser. No. 640,469

4 Claims. (Cl. 29—103)

This invention, in general, relates to inserted-blade milling cutters.

Cutting blades in milling cutters are subjected to two types of vibration. On pages 317 ff. of section 17 of the Tool Engineers Handbook (1949) it is explained that these vibrations are (a) forced vibration and (b) self-induced vibrations. The forced vibrations occur through rhythmical variation of the force on the cutting tool which produce a vibratory motion of the cutting tool, the workpiece or both. The self-induced vibrations are induced by deflecting forces acting on the cutting blade and occur at a frequency very close to the natural frequency of the vibrating member. Of the two types of vibrations, the latter is ordinarily more severe.

It has been proposed to mold the carbide cutting blades of milling cutters in steel blanks or holders by employing a resin as a matrix. While the resin material may be a successful shock absorber—thus saving the fragile carbide blades, which have poor vibration resistance properties, from fracture and ultimate failure—resins, in general, are not very heat resistant. At temperatures in the order of 400° F. and above resins lose some of their binding properties on the carbide blades. The blades are thus subject to becoming loose and poorly positioned in the cutter block.

This invention is primarily concerned with inserted-blade milling cutters and processes for manufacture of said cutters—the inserted blades being cushioned by a more heat-resistant material having good cushioning properties. One preferred cushion material herein utilized is copper, and one process for securing the cutter blades in the cutting head is by use of a nonferrous filler metal in a manner hereinafter described.

Figure 2:
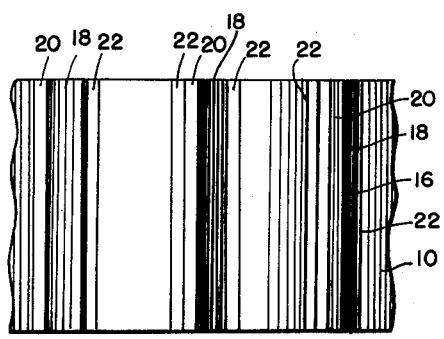

It is, therefore, an object of the present invention to provide inserted-blade milling cutters so constructed as to cushion vibrations of the cutting blade. Another object is to provide inserted-blade milling cutters adapted to be used at high work feed rates. A still further object is to provide inserted-blade milling cutters, the blades of which are cushioned against vibratory movement by a material having excellent heat-resistance. Still another object is to provide methods for mounting cutter blades in an inserted-blade milling cutter. Other objects will be apparent to those skilled in the art from the following description of the invention in conjunction with the drawing wherein:

Fig. 1 represents an elevation in partial detail of a plain milling cutter with cutting teeth on the circumferential surface; and Fig. 2 is a partial plan view of the cutter of Fig. 1 along the section 2—2 of Fig. 1.

In accordance with the invention, the inserted-blade milling cutters comprise a metal holder or blank having grooves in which are mounted the cutting blades. The cutting blade is cushioned by thin metal shims, e.g., copper, zinc, silver, gold, aluminum, and certain alloys, positioned between the side and lower walls of the groove and the cutting blade.

In assembling the milling cutters, the cutter steel blank or holder 10 with a central axial aperture 12 adapted to receive an arbor or spindle is milled to obtain a series of spaced, narrow slots 14 for mounting the cutter blades. The slots are conformed to the shape of the cutter blades which may be straight, as illustrated in the drawing, or helical, for example. The milling cutter illustrated in Fig. 1 is a plain milling cutter (slabbing mill), which is a cutter of plain cylindrical form having straight or helical teeth on the circumference surface only. It will be understood, however, that the invention is applicable to other types of inserted-blade cutters such as side milling cutters, face milling cutters, and milling cutters, face and end milling cutters, staggered tooth side milling cutters, profile cutters, slitting saw cutters, and others. These cutters are described and illustrated on pages 1458 to 1464 of the aforesaid Tool Engineers Handbook.

The invention will first be described with respect to inserted-blade cutters wherein shims consisting of thin plates of copper are utilized. Before the cutter blades 16 and copper shims 22 are placed in the slots 14, the preferred procedure is to coat with a non-ferrous filler metal, preferably having a melting point above 700° F., the contacting surfaces—the walls of the slots 14, the copper shims 22, and the cutter blades 16. The copper shims, preferably of high purity copper, are then fitted in each slot 14 on each side and at the bottom, as shown in Fig. 1. It is important that the blades and shims be fitted snugly into the slots without any play between the component elements. The assembled cutter holder or blank with the blades and shims therein is then placed in a furnace at a temperature sufficient to heat the assembly above the melting point of the nonferrous filler metal to secure union of the various parts. The union is that of the copper shims with the walls of the slots and also the cutter blades obtained by the melting and subsequent solidification of a nonferrous filler metal at a temperature below the melting point of the component parts.

The blades of the cutter are then ground to provide inclined surfaces 18 having a clearance angle preferably between 5 and 7° and slight lands 20, if desired.

The invention herein described is eminently suitable with respect to inserted-blade milling cutters in which the blades are carbide blades such as tungsten carbide, tungsten titanium carbide or such other powdered metallurgy carbide cutters as are commonly known and employed in the metal removal art. As previously explained, the carbide cutters are particularly susceptible to vibratory motion and the cushioning effect of the copper shims reduces the deleterious effect on the carbide cutters. The shock absorbing properties of the copper shims, however, may also be utilized to advantage with cutter blades of other materials such as high speed steel, ceramics or oxides.

The choice of the nonferrous filler metal is largely determined by the temperatures which the cutter blade holder 10 and the cutter blades 16 can withstand in order to secure the melting of the nonferrous filler metal. Typical nonferrous brazing metals are silver alloys, having melting points between about 1125 and 1600° F.; bronze or brass alloys, having melting points in the approximate range of 1600–1900° F. and pure copper with a melting point at about 1980° F. In the manufacture of inserted-blade milling cutters with carbide blades, silver alloy brazing, often called "hard soldering" or "silver soldering," preferably is used. Silver brazing alloys contain amounts of silver varying from 5–80% and other elements such as copper, zinc, cadmium and phosphorus. Some typical silver brazing alloys are described in Table 80-1, page 1168, of the aforesaid Tool Engineers Handbook. The silver alloys are preferred because of their lower melting points. It is to be recognized, however, that in instances where the blade holder 10 and blades 16 can withstand the temperatures necessary to secure brazing, the higher melting bronze or brass alloys or pure copper may be utilized as the brazing compound. In some instances, certain soft solders may be used in a well-designed joint. Soft solder alloys include tin-lead alloys, tin-lead-antimony alloys, and silver-lead alloys. Some of these soft solders are described in Table 79–1, page 1162, of the aforesaid Tool Engineers Handbook. For most purposes, brazing is preferred because of strength factors and a lesser likelihood of melting of the alloy when the cutting tool becomes heated during use.

Preliminary tests indicate that the carbide inserted-blade milling cutters of the present invention are capable of milling steel at a cutting velocity of 1500–4000 surface feet per minute (s.f.p.m.). The term "surface feet per minute" is basically a measure of the peripheral velocity of the cutter while metal is being removed from the workpiece and while retaining maximum cutter life. In the preliminary tests, the rate of metal removal, measured in inches per minute (i.p.m.), was as high as about 600 i.p.m. The rate of metal removal is a measure of the linear motion of the work past the cutter. The rate of metal removal is a function of chip load, number of teeth in the cutter, and the r.p.m. of the cutter. The pitch (see Fig. 1) may be as low as 1/8" or coarser, depending upon the size of the cutter, but is preferably not more than 1/2". The blades are preferably at least 3/32" thick and the overhang (see Fig. 1) is a maximum of about 1/32" to reduce the effect vibration and shock have on the cutter blade. The copper shims are preferably at least about 0.025" thick. Shims of a thickness of about 0.025–0.030" have proven quite satisfactory.

*Experimental tests*

Tests on experimental cutters of this invention having only one or a few carbide blades were carried out on a shaper under severe vibration conditions. The bonding strength of the silver brazing and the cushioning effect of the copper shims were very good.

In one test, the holder for the experimental cutter was milled with only 2 slots for 2 carbide blades. Copper shims were fitted in each slot on each side of the blade and at the bottom beneath the blades. The shims were fluxed with a silver brazing metal on all surfaces before assembly. The assembled holder with the blades and shims was placed in a furnace at a temperature of 1300° F., and the silver brazing was completed. The blades and shims were fitted snugly into the slots prior to brazing without any play between the members.

The experimental cutter was ground with a slight land (.010") and a clearance angle (5 to 7°). One blade was positioned about .003" above the level of the other blade, in order to clean up the surface machined by the first blade. This procedure was followed only for the experimental cutter. In normal milling operations, where circular cutters are employed, all blades around the circumference are equidistant from the center of the cutter. The depth of cut in the experiment was .030".

The experimental cutter was tested on a shaper for vibration resistance and strength of the silver brazing and the effect of the copper shims as a vibration damper for the carbide blades. A fixture was designed and built for supporting the cutter on the shaper. The blades and holder were assembled at 22½° angle in the fixture to simulate the 22½° helix angle of the regular milling cutter.

The experimental cutter was run on a shaper for 5 minutes, 10 minutes, 15 minutes, and 20 minutes. At the end of 20 minutes the blades proper started to slowly chip away, but the blades were still held tightly in the steel holder. After 5 more minutes running, the chipping of the blades was so pronounced that the experiment was terminated. Upon careful examination, there was no trace of weakening of the bonds of blades in the steel holder, and the brazing joints and positioning of the blades were unaffected. The reason for chipping of the carbide blades was the 1/8" overhang of the blade with respect of its support in the holder. It is reasonable to assume that if this overhang of blade is held to maximum of 1/32", the life of the cutter so designed and constructed will be quite long, especially if the cutter is for milling, where conditions are more favorable as compared with that of a shaper tool and where the velocity of cutting is more constant and the effect of shock and vibration are not so pronounced.

While the invention has been described primarily with respect to the use of copper shims between the walls of the holder and the cutter blades, it will be understood that other metal shims can be employed similarly provided the metals have a predetermined minimum melting point and a modulus of elasticity within a predetermined range. The melting point of the metal shim should be at least 700° F. and usually does not exceed about 2000° F. The range of the modulus of elasticity is from $6 \times 10^6$ to $20 \times 10^6$. Examples of suitable metals within the aforesaid predetermined limits are zinc, which has a modulus of elasticity of $6 \times 10^6$ and a melting point of 787° F., copper, which has a modulus of elasticity from 13 to $17 \times 10^6$ and a melting point of 1980° F., silver, which has a modulus of elasticity of $10.3 \times 10^6$ and a melting point around 1700° F., gold, which has a modulus of elasticity of $11.3 \times 10^6$ and a melting point around 1950° F., aluminum, which has a modulus of elasticity of $10 \times 10^6$ and a melting point around 1220° F., and alloys of these metals and other metals having moduli of elasticity within the aforesaid range and a melting point of at least 700° F., including brass (alloys of copper and zinc), bronze (alloys of copper and tin), alloys of silver and copper, alloys of aluminum and copper and alloys of aluminum and zinc. Instead of a nonferrous filler metal, the shim itself, particularly in the case of shim metals of relatively low melting point, may be used to bond the cutter blades in the holder by heating the assembled cutter above the melting point of the shim so long as the component parts of the cutter can withstand the heat necessary to melt the shim metal sufficiently to bond it to the holder and cutter blades. The employment of a nonferrous filler metal is to be preferred, however, to obtain the strongest union between the component parts.

The invention is hereby claimed as follows:

1. An inserted-blade milling cutter comprising a cylindrical steel blank having grooves with side walls of substantially equal depth in the cylindrical surface, metal shims lining the walls of said grooves, and carbide cutter blades snugly fitted in the lined grooves, said cutter blades extending beyond the surface of said blank to provide a small overhang said metal shims being bonded to the walls of said grooves and said cutter blades by a nonferrous metal, the metal shims having a thickness of at least 0.025" a modulus of elasticity in the range of $6 \times 10^6$ to $20 \times 10^6$.

2. An inserted-blade milling cutter comprising a cylindrical steel blank having grooves with side walls of substantially equal depth in the cylindrical surface, metal shims lining the walls of said grooves, and carbide cutter blades snugly fitted in the lined grooves, said cutter blades extending beyond the surface of said blank to provide a small overhang said metal shims being brazed by a brazing metal having a melting point above 700° F. with the walls of said grooves and said cutter blades, said metal shims having a thickness of at least 0.025", a melting point of at least 700° F. and a modulus of elasticity in the range of $6 \times 10^6$ to $20 \times 10^6$.

3. The milling cutter of claim 2 wherein said metal shims are thin plates of copper having a modulus of elasticity in the range of $13 \times 10^6$ to $17 \times 10^6$.

4. The milling cutter of claim 2 wherein said metal shims are thin plates of a copper alloy which are brazed to said walls of said grooves and to said cutter blades by a nonferrous sliver brazing alloy having a melting point between 1125 and 1600° F.

References Cited in the file of this patent

UNITED STATES PATENTS

| | | |
|---|---|---|
| 903,469 | Peck | Nov. 10, 1908 |
| 1,180,377 | Conklin | Apr. 25, 1916 |
| 1,761,755 | Smith | June 3, 1930 |
| 1,797,026 | Sharp | Mar. 17, 1931 |
| 1,843,549 | Firth | Feb. 2, 1932 |
| 1,887,373 | Emmons | Nov. 8, 1932 |
| 1,908,208 | Yassenoff | May 9, 1933 |
| 2,210,314 | Wright | Aug. 6, 1940 |
| 2,308,569 | St. Clair | Jan. 19, 1943 |
| 2,474,643 | Webb | June 28, 1949 |

FOREIGN PATENTS

| | | |
|---|---|---|
| 16,879 | Great Britain | July 23, 1907 |